United States Patent [19]

Churchill, Jr.

[11] 4,056,845
[45] Nov. 1, 1977

[54] MEMORY ACCESS TECHNIQUE

[75] Inventor: William P. Churchill, Jr., Carlisle, Mass.

[73] Assignee: Data General Corporation, Southboro, Mass.

[21] Appl. No.: 571,573

[22] Filed: Apr. 25, 1975

[51] Int. Cl.[2] .......................................... G06F 13/00
[52] U.S. Cl. .................................................. 364/200
[58] Field of Search ................. 340/172.5; 364/200, 364/900

[56] References Cited

U.S. PATENT DOCUMENTS

| | | | |
|---|---|---|---|
| 3,445,820 | 5/1969 | Wissick | 340/172.5 |
| 3,588,829 | 6/1971 | Boland et al. | 340/172.5 |
| 3,588,839 | 6/1971 | Belady et al. | 340/172.5 |
| 3,693,165 | 9/1972 | Reiley et al. | 340/172.5 |
| 3,699,530 | 10/1972 | Capowski et al. | 340/172.5 |
| 3,764,996 | 10/1973 | Ross | 340/172.5 |
| 3,810,110 | 5/1974 | Kotok et al. | 340/172.5 |
| 3,820,078 | 6/1974 | Curley et al. | 340/172.5 |
| 3,829,840 | 8/1974 | Burk et al. | 340/172.5 |
| 3,840,862 | 10/1974 | Ready | 340/172.5 |
| 3,866,183 | 2/1975 | Lange | 340/172.5 |

OTHER PUBLICATIONS

Christensen et al. – Overrun Protection for Buffer Stacks; IBM Tech. Discl. Bulletin, vol. 15, No. 12, May 1973, pp. 3857-3858.

Primary Examiner—Malcolm A. Morrison
Assistant Examiner—Errol A. Krass
Attorney, Agent, or Firm—Robert F. O'Connell

[57] ABSTRACT

A memory access technique for use in digital data processing apparatus, particularly in mini-computer systems, in which a plurality of memory modules are used, each of the modules having a main memory and a higher speed auxiliary, or "cache" memory, the data in the "cache" memories of a plurality of modules being capable of storage therein in an interleaved manner. Appropriate modifiable interconnection means, such as modifiable jumper connections, are provided on each memory module to permit the modules to be arranged for either interleaved or non-interleaved operation. As additional modules are added to the system, additional "cache" memory storage is automatically added and the capability of higher order interleaving becomes readily possible.

10 Claims, 16 Drawing Figures

5-BIT REFRESH COUNTER

MEMORY ACCESS TECHNIQUE

INTRODUCTION

This invention relates generally to memory systems for digital computers and, more particularly, to improved memory systems utilizing high speed buffer memory units for establishing a storage hierarchy.

DESCRIPTION OF THE PRIOR ART

Access to memories of high speeds is of utmost concern in order to provide for the rapid processing of data and to take advantage of the high speed central processor units (CPU) presently available. One way to achieve increased memory speed is to provide for a memory hierarchy scheme wherein a large and relatively slow main memory unit and a smaller, high speed auxiliary memory unit are connected to the central processing unit. The fast memory, commonly known as a "cache" memory unit, serves as a means for storing selected data from the main memory. The data from the main memory, which is loaded into the cache unit in quantities of usually several words (or bytes) at once, is selected to include data which it is anticipated will be requested by the CPU in subsequent memory requests. If such is the case, then memory speed is accordingly increased by serving the CPU from the high speed cache memory rather than from the slower speed main memory.

A memory system of the cache type requires memory management which must determine: first, whether data requested by the CPU is in cache and, if so, where; second, if such data is not in cache, at what location in cache is the data from the slow memory to be loaded; third, how does the CPU modify fast and slow memory, and, fourth, how is the system to be initialized on power-up.

A cache memory scheme also uses an associative memory unit which contains the addresses of data in the cache as related to the slow memory. This associative memory can be effectively implemented as a content addressable memory (CAM) which provides for a simultaneous search of all its locations to determine if the data desired by the CPU is in the cache, and if so, where.

Among the several items governing the performance of a memory system of the type being discussed, is the ratio of speed between the slow memory and the cache. This also may be determined by the relative size of the cache and slow memory. Once a cache size and speed is selected to provide desirable performance memory management must be arranged to provide an efficient method for the replacement of old words in cache with new ones.

In order to increase the effectiveness of the cache memory system it is desirable that the speed of operation thereof be further improved so that the gain in performance originally obtained by the use of a cache technique be even further enhanced.

SUMMARY OF THE INVENTION

In accordance with the invention the cache memory system increases the overall speed of operation by utilizing an interleaved cache memory system. Normally groups of words which are expected to be used in sequence are stored in a cache memory unit so that access thereto can be obtained at the higher speed of operation provided by the cache rather than at the lower speed of the main memory. However, such sequentially used words cannot be made available simultaneously since access to only one module at a time can be achieved. Hence, even if memory management can be arranged to overlap portions of sequential steps in a sequence of operations by providing for accessing of a subsequent word before the processing step for the previous word has been completed, advantage cannot be taken of such operation if the sequential words are stored in the same cache memory unit.

In accordance with the interleaving process, words which are normally expected to be requested in sequence are stored in different cache memory units. Such an interleaved storage technique thereby reduces the chance that words which are to be used sequentially will reside in the same cache and increases the chance that such sequential words can be accessed effectively simultaneously, i.e., the next word of a sequence can be accessed before the processing of the previous word has been completed. In this way, the overall speed of operation can be enhanced for systems wherein such overlapping access can be achieved.

In arranging such interleaved cache systems, particularly for relatively small computer systems wherein storage capacity is relatively small, the overall memory system can be arranged in the form of a plurality of memory modules, each module having a first portion having a relatively slow speed of operation and a relatively large capacity together with a second portion having a much smaller capacity and a much higher speed of operation, i.e., a "cache" portion. For example, a 64-K word memory system may be arranged to use eight modules, each module having an 8-K main storage portion and a cache portion utilizing four blocks of four words each. In such a system, 32 blocks of cache words are available, such words being capable of storage in a two-way, a four-way, or an eight-way interleaved fashion as described in more detail below.

An important advantage of such a system lies in the fact that each memory module includes both a main memory portion and a cache memory portion. As main memory capacity is increased by the addition of one or more modules, cache memory capacity is also increased. Moreover, means are provided on each memory module for permitting the relatively easy selection of an appropriate interleaving of the cache memories thereof in accordance with the number of memory modules being used.

The invention can be described in more detail with the help of the following drawings wherein.

DESCRIPTION OF THE PREFERRED EMBODIMENT

Figure 1:
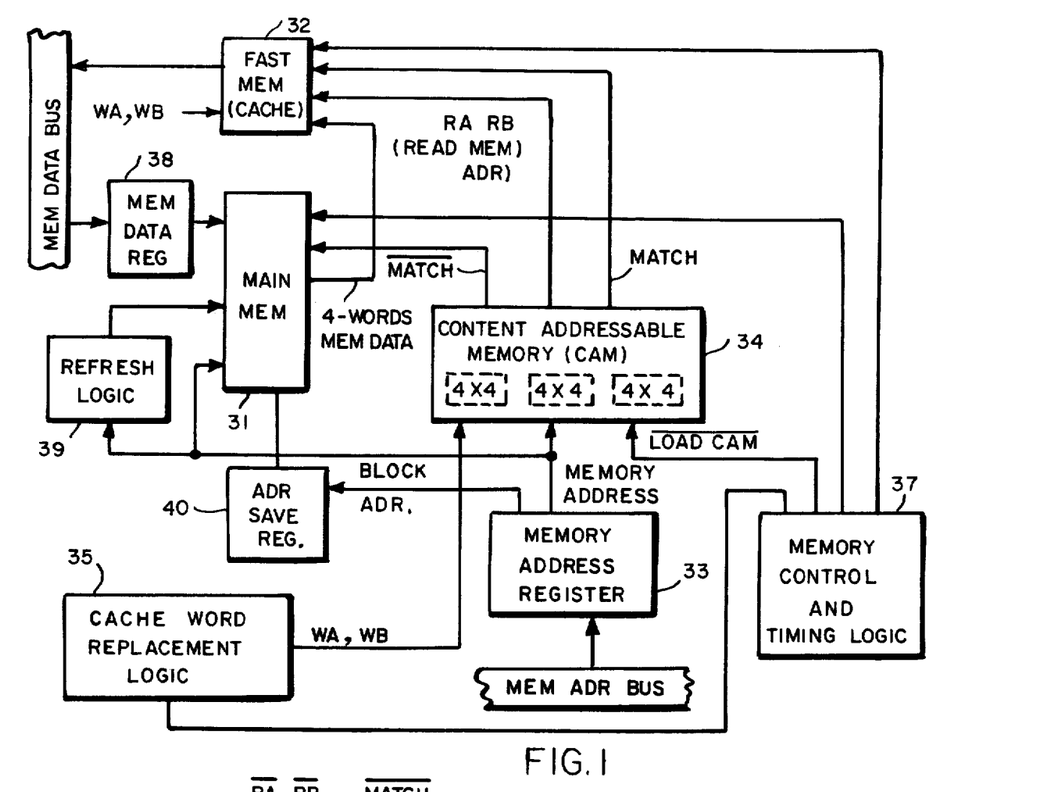
FIG. 1 is an overall block diagram of a memory module of the invention using a main memory and an auxiliary cache memory.

With reference to the drawings, a block diagram generally describing a typical memory module used in the present invention is illustrated in FIG. 1 wherein there is shown a main memory portion 31 having a cycle time, for example, of 600 ns and a smaller, higher speed semi-conductor memory 32, generally referred to as the cache, having a cycle time, for example, of 100 ns to 200 ns. Main memory portion 31 is connected to a memory data bus and, in addition, from a memory address register 33, the latter in turn being connected to a memory address bus, as shown, via a memory data buffer register 38.

An associative memory unit in the form of a content addressable memory (CAM) 34 is connected from the memory address register 33 and is designed to compare data on its inputs with data already stored in its memory to indicate a match when these data are identical. This equality search is performed on all bits in parallel. The stored data is four twelve-bit words and the signal input is one eleven-bit word from the memory address register 33 and a validity bit. The outputs of CAM 34 include a signal to the cache memory 32 when a match is found (MATCH) and a signal to the main memory 31 when a match is not found ($\overline{\text{MATCH}}$). In addition, an address, denoted as RA and RB, designating a fast memory location in cache 32 is supplied to the cache when a match occurs.

The main memory 31 is also connected for loading the cache 32 with four words or one block of memory data when instructed to do so. The WA and WB signals which are supplied to the cache 32 and to the CAM 34 will always denote the cache address where the data from the main memory portion 31 is to be written and is obtained from the cache word replacement logic unit 35. The specific logic used for such unit does not form a necessary part of this invention and any appropriate method for selecting the words which are to be stored in cache may be used. One appropriate technique, and the logic therefor, is described in pending U.S. Patent application Ser. No. 436,023 now Pat. No. 3,949,369, entitled "Memory Access Technique", filed by William P. Churchill on Jan. 23, 1974 and assigned to the same assignee as this invention.

The memory control logic 37 is connected to cache memory 32, main memory 31, CAM 34, and cache word replacement logic 35 to ensure that the proper sequence of information handling is maintained, as will become evident hereinafter.

The system of the invention preferably utilizes a dynamic semiconductor main memory 31 which, since the data stored therein deteriorates over a time period, requires that such data be appropriately refreshed on a periodic basis. Suitable refresh logic 39 and an "Address Save" register 40 are required for such purpose as described in more detail below.

Figure 2:
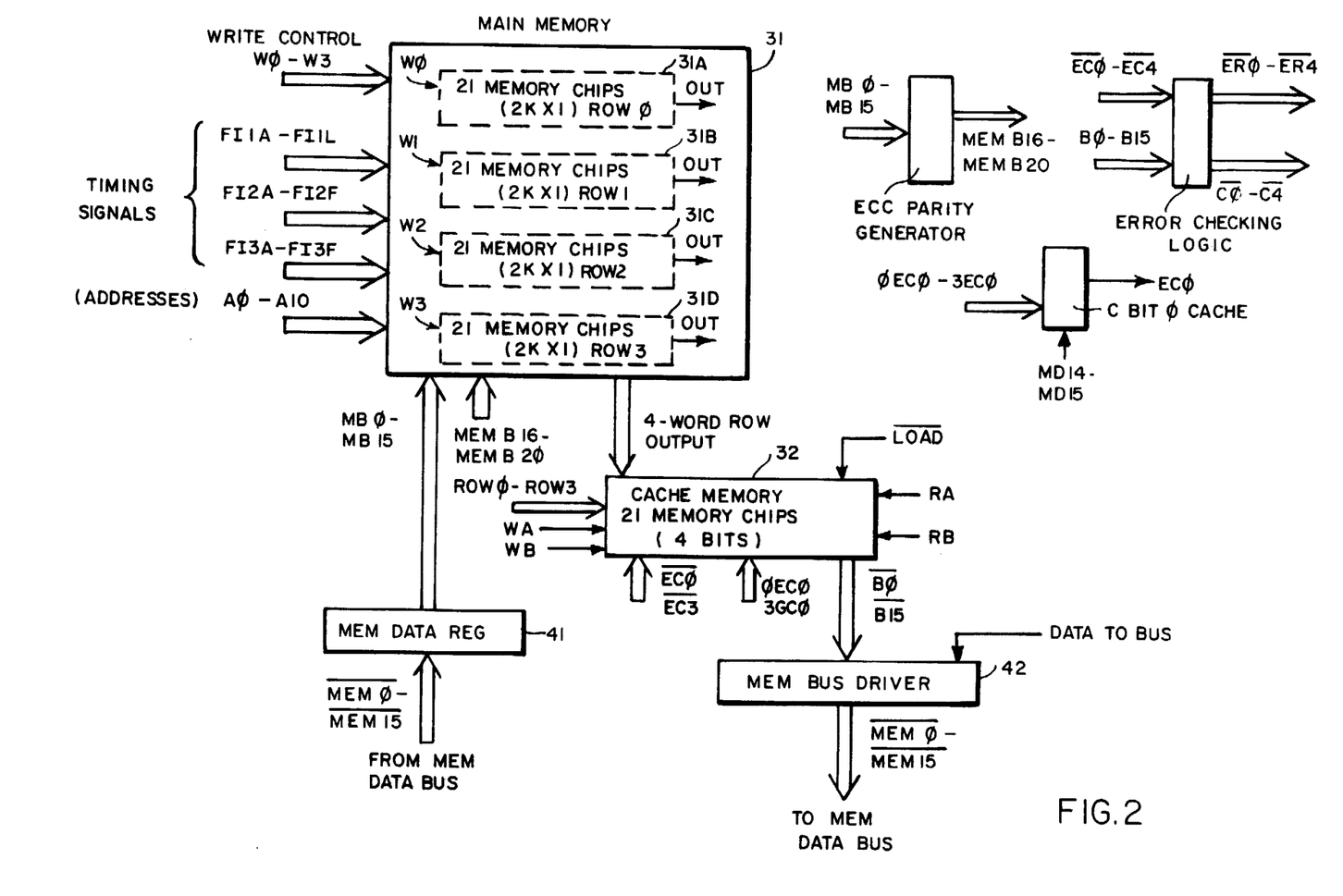
FIG. 2 shows a more detailed view of a portion of the main and cache memories of the module of FIG. 1.

As can be seen in the embodiment described in FIG. 2, the main memory comprises four rows 31A, 31B, 31C and 31D of memory chips corresponding to Row $\phi$, Row 1, Row 2 and Row 3, respectively, each row including 21 memory chips and each chip being a (2K × 1) chip. Thus, the main memory has a capacity for the storage of 8K words, each word being 21 bits in length. A cache memory 32 comprises 21 4-bit memory chips and, therefore, has a total capacity of 84 bits representing four 21 bit words. The system is arranged so that four words are written into the cache memory from the main memory at a time, while a single word is written at any one time into the main memory from the central processor unit.

Figure 3:
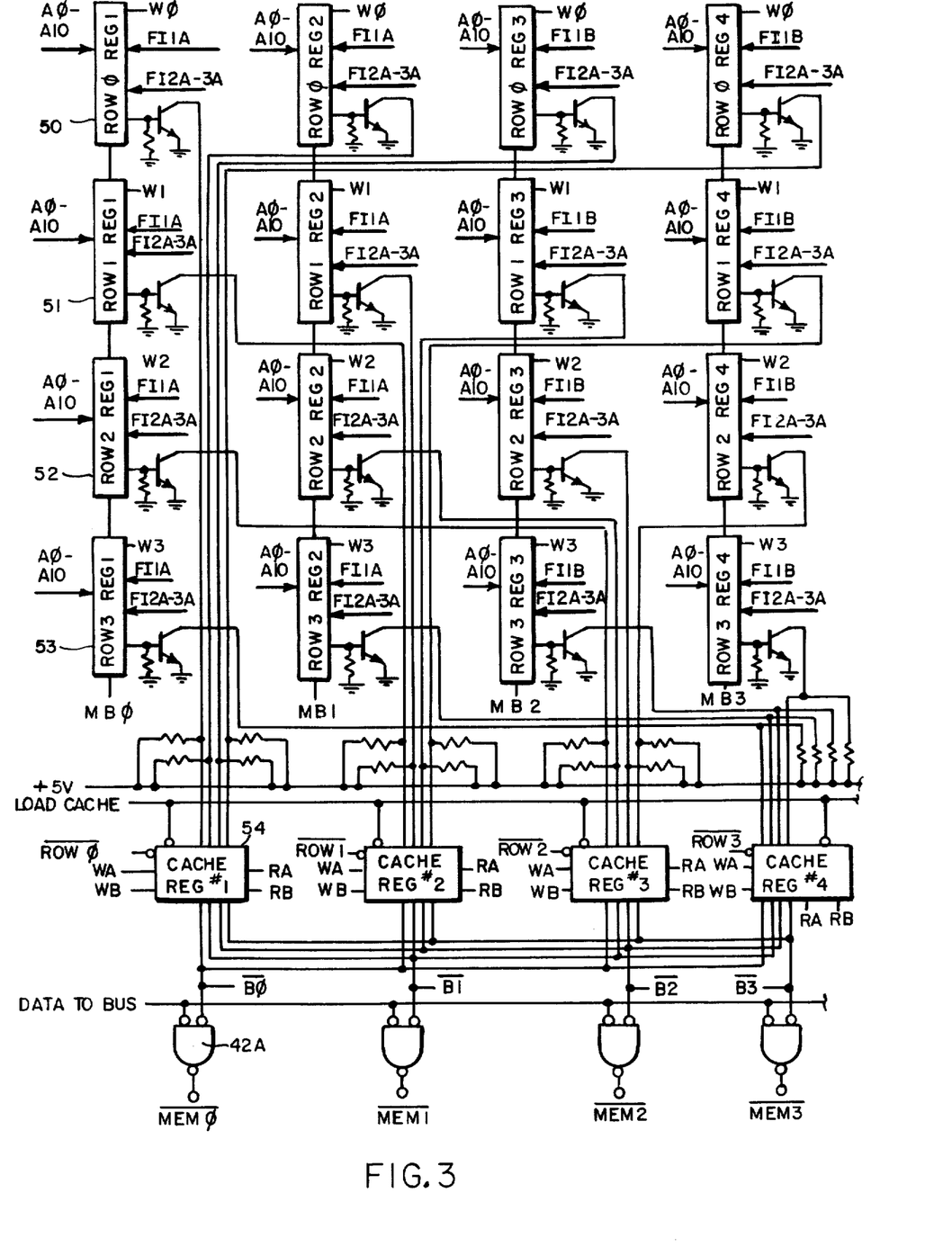
FIG. 3 shows a still more detailed view of a part of the main memory and cache memory of the memory module of FIG. 1.

As seen more specifically with reference to FIG. 3, typical connections between the specific column of four registers 50, 51, 52 and 53 in the main memory, each of which stores a bit of each of 8K words stored in the overall main memory, and a register 54 of the cache memory which stores a bit of four words stored in the cache memory are depicted. For the system being described herein, such column represents one of twenty-one such columns for storing 21-bit words in the main and cache memories, 16 of such bits representing the bits of a 16-bit data word and the remaining 5 bits being utilized for error correction purposes not forming a part of the invention herein. Accordingly, the interconnections with respect to the latter bits are not described in detail.

The interconnections between the four rows of main memory registers (each row containing 16 of such registers) and the cache memory registers (comprising 16 of such registers) are arranged in groups of four columns, one such group being specifically shown in FIG. 3 with reference to the interconnections between main memory registers 1-4 of Rows $\phi$-3 and cache memory registers 1-4. Although not shown specifically in the drawings, substantially the same corresponding interconnections are provided with reference to main memory registers 5-8 of Rows $\phi$-3 and cache memory registers 5-8, main memory registers 9-12 of Rows $\phi$-3 and cache memory registers 9-12, and main memory registers 13-16 of Rows $\phi$-3 and cache memory registers 13-16.

The memory bits $\overline{\text{MB}\phi}$ - $\overline{\text{MB15}}$ are supplied from the memory data bus via the memory data buffer register 41. Cache register #1, for example, stores a bit from each of four registers of a particular row, here specified, for example, as Row $\phi$ of the main memory, while cache register #2 stores a bit from each of four registers of Row 1 of the main memory, cache register #3 stores a bit from each of four registers of Row 2 of the main memory and cache register #4 stores a bit from each of four registers of Row 3 of the main memory. Thus the 16 cache data registers store four 16-bit data words (as well as four 5-bit error correction words) in the system described.

The WA and WB signal denote the addresses into which the words are to be stored, such storage occurring as a result of a $\overline{\text{LOAD CACHE}}$ signal. The cache memory can transfer a word to the memory data bus via memory bus drivers 42 (one element of the first column being designated as element 42A as shown in FIG. 3). The RA and RB signals denote the address from which such word is to be read, such transfer occurring as a result of a $\overline{\text{DATA TO BUS}}$ signal. Appropriate timing signals are supplied to the main memory 31, as well as address signals A$\phi$ - A10 as shown, data being entered into the main memory upon the occurrence of write enable signals, W$\phi$ - W3, for each of the rows of the main memory.

Figure 4:
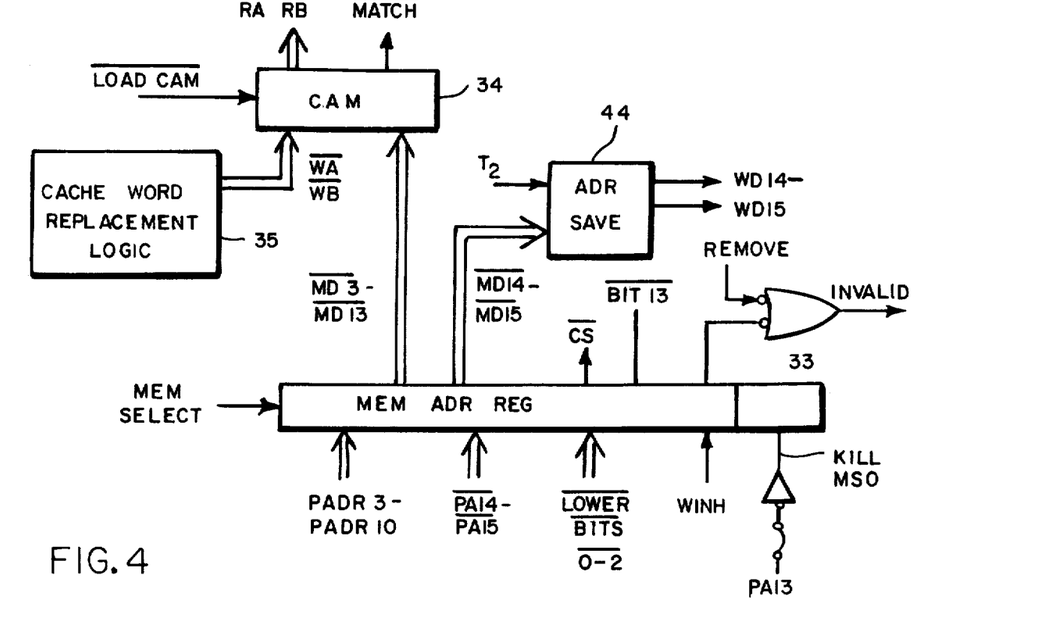
FIG. 4 shows a more detailed portion of another portion of the memory module of FIG. 1.

As seen in FIG. 4 the memory address register 33, in addition to supplying the 11-bit address and validity information to the CAM 34, also supplies the bits ($\overline{MD14}$ and $\overline{MD15}$) which identify the address to be saved in the address save logic 44 during the write operation as described below.

Figure 5:
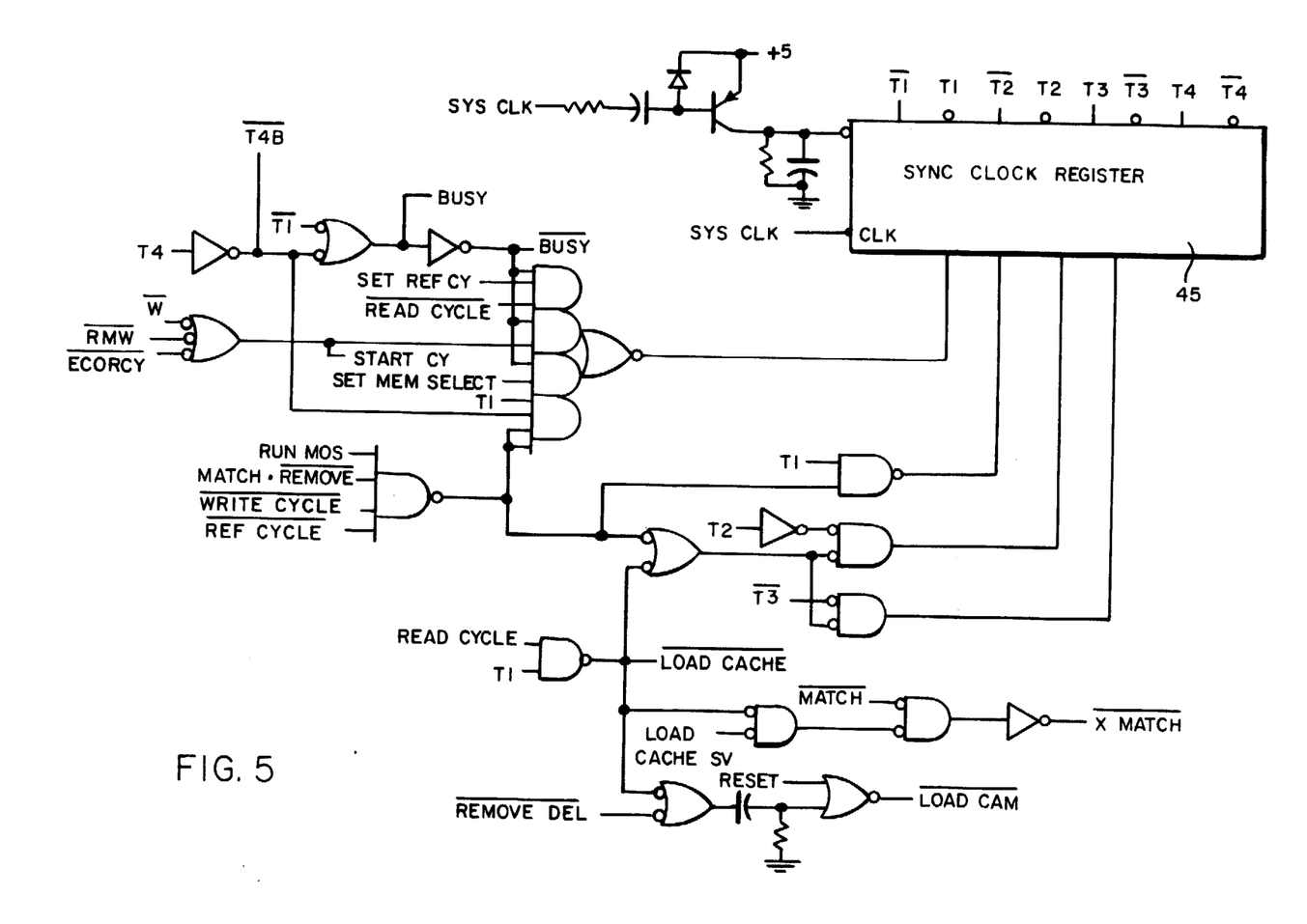
FIGS. 5 and 6 show the timing logic of the memory module of FIG. 1.
Figure 6:
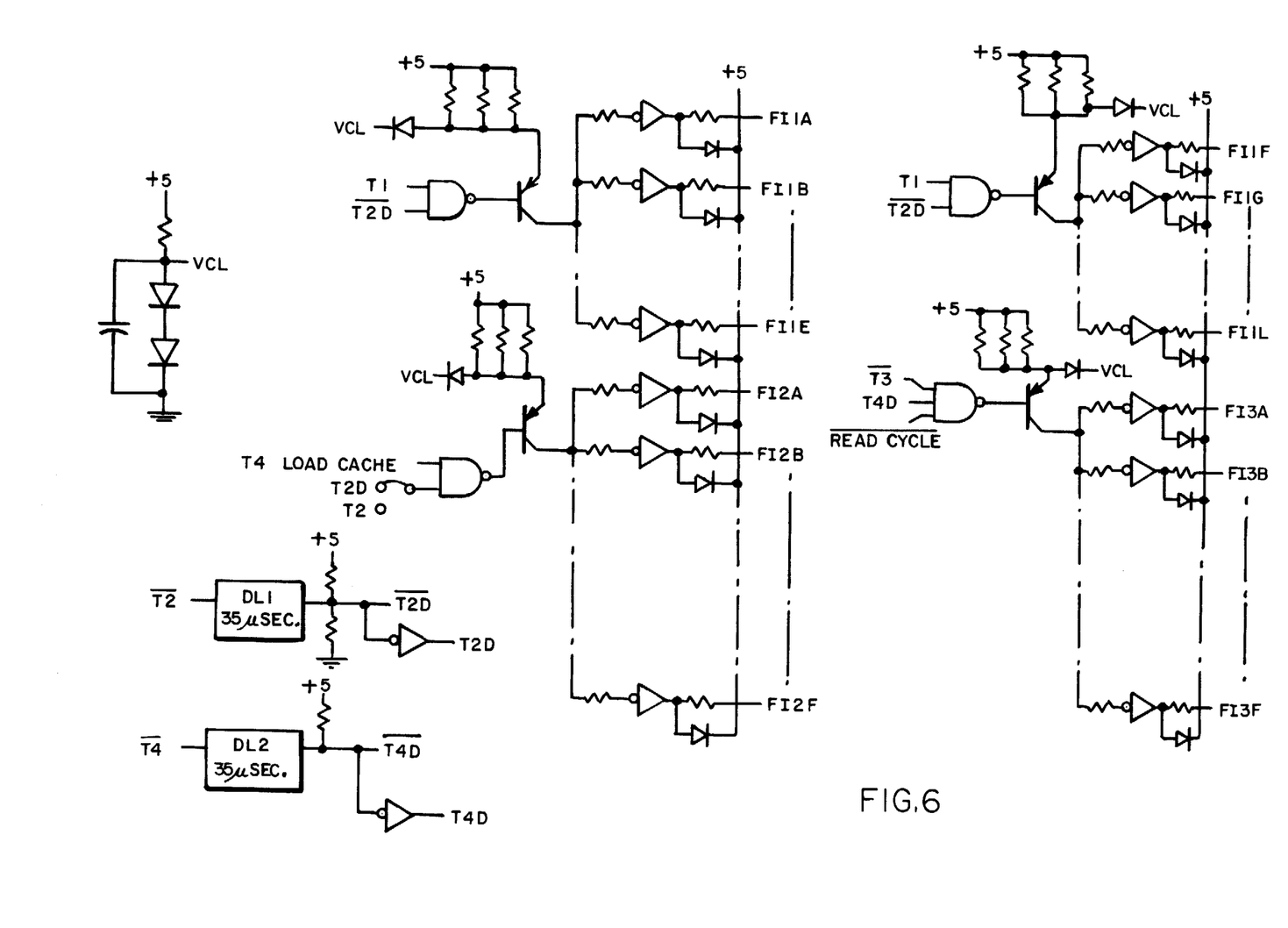
Figure 7:
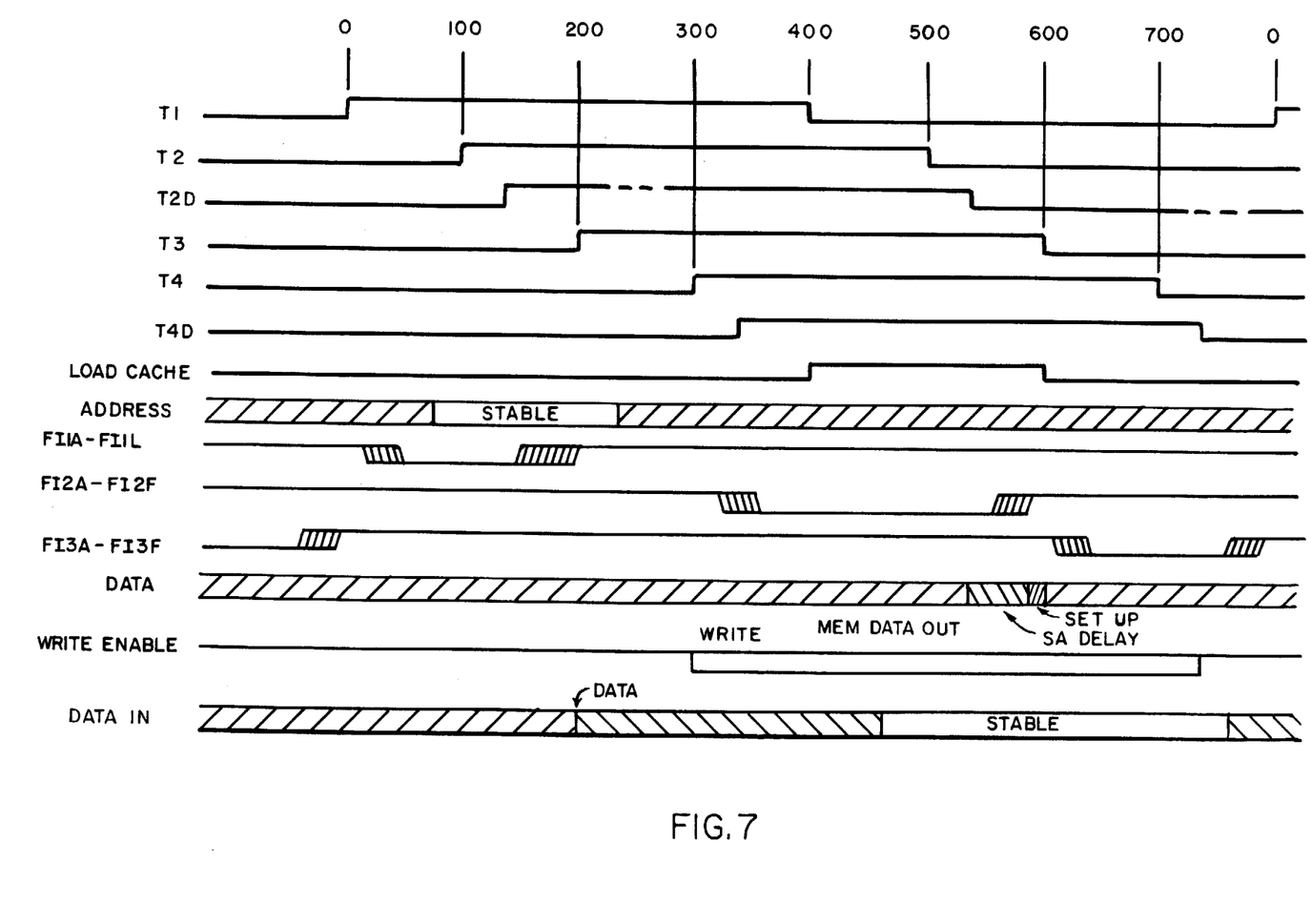
FIG. 7 shows a timing diagram depicting the time relationship among various signals of the timing logic of FIGS. 5 and 6.

FIGS. 5 and 6 depict the timing logic for the memory module and include a synchronous clock register 45 which provides the timing signals T1-T4 and the logic for producing the F11, F12 and F13 driver signals. Because of electrical loading considerations such signals are generated as the plurality of signals FI1A--FI1L, FI2A-FI2F and FI3A-FI3F shown in FIG. 6 for driving different logic elements required for operation of the main memory. The relationship of the timing signals of FIG. 5 and certain other signals of the memory module is shown in the timing diagram of FIG. 7 for operation over the 800 nanosec. operating cycle of the main memory.

The clocks of the MOS main memory are driven by the clock driver signals shown in FIG. 6, which latter signals are in turn driven from the timing signals from the clock synchronous register 45. The clock drivers operate in three stages. The first stage, requiring clock driver signals FI1A-FI1L, provides for precharge and initialization of the main memory, thereby effectively starting the operation of the main memory and latching addresses at the end of such stage. All rows of the main memory are read into the cache simultaneously.

The second stage, requiring clock driver signals FI-2A-FI2F, is a "read" stage for reading data out of each memory unit matrix (i.e., each 2K chip of the main memory).

The third stage, requiring clock driver signals FI3A-FI3F, is a "write" stage and writes data into the main memory from the memory data register or completes the refresh cycle (as discussed below).

Figure 8:
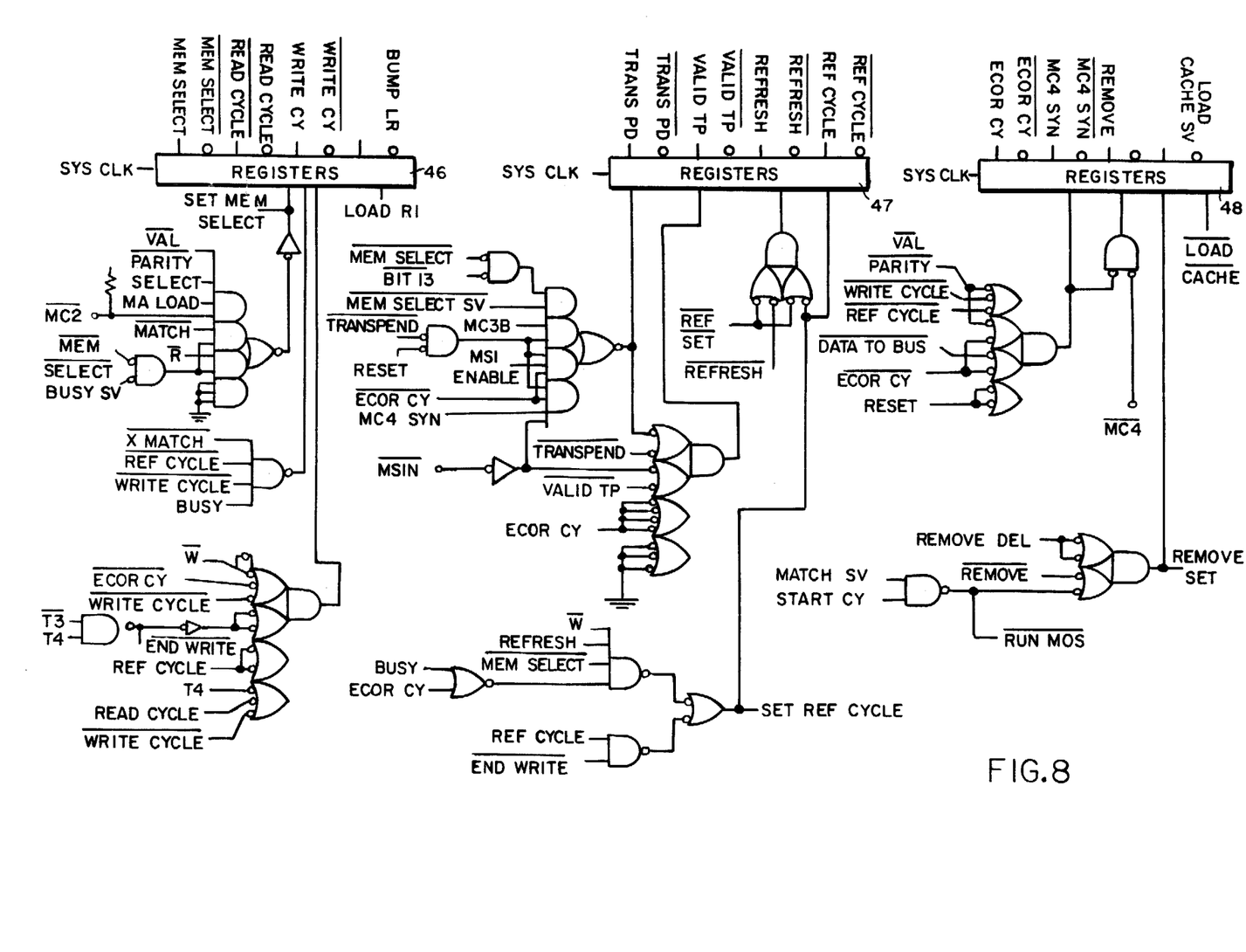
FIGS. 8, 9 and 10 show more detailed diagrams of the memory control logic of FIG. 1.
Figure 9:
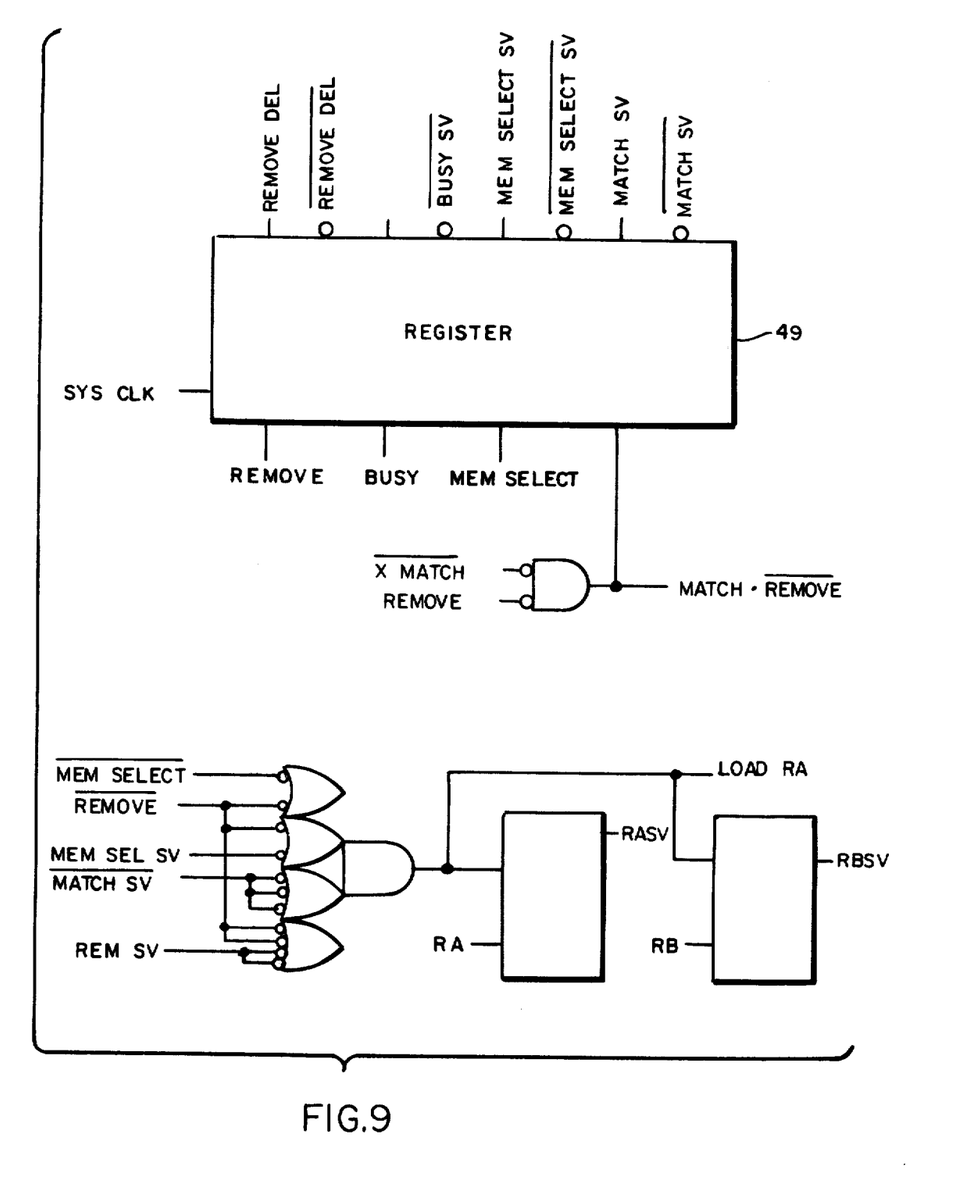
Figure 10:
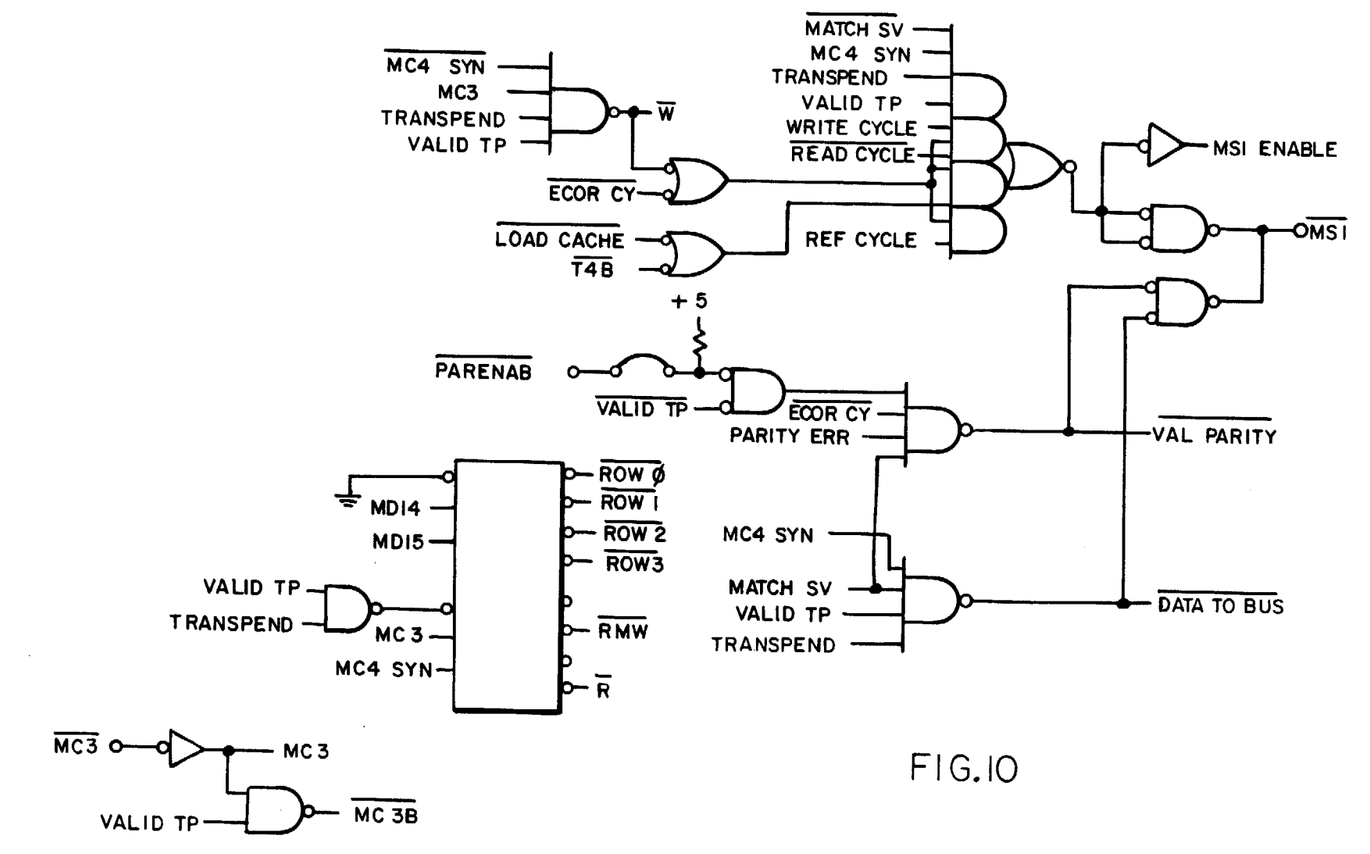

The memory control logic is depicted in FIGS. 8, 9 and 10. FIG. 8 shows three registers 46, 47 and 48 for providing appropriate control signals as shown. For example, once the memory module has been selected by the central processor unit a suitable control signal indicates that selected module has accepted the address from the memory address bus and that the processing of such address can begin. Further, signals for beginning the read or write cycles (READ CYCLE, WRITE CYCLE) are provided, as well as signals indicating whether a data transfer from the memory module is still pending (TRANSPEND), and whether the memory data bus is ready for the transfer of data thereto (VALID TP). Further signals include a request for a refresh cycle (REFRESH) and the initiation of such a refresh cycle (REF CYCLE). If the module is in an error correction cycle (ECORCY), a signal is provided, while the presence of an appropriate clock signal (MC4SYN) provides for internal synchronization of the read and/or write operations without the need for external synchronization thereof from the central processor unit. If it is desired that the data at a selected address in the main memory of the module is to be changed and data at such address is also stored in the cache memory, a (REMOVE) signal is provided while the data is updated in the main memory, which signal indicates that the previously stored data in the cache is invalid and prevents a match from being made at the CAM 34 by writing the invalid condition in the CAM 34 ($\overline{LOAD}$ $\overline{CAM}$). If a command to load the cache memory (LOAD CACHE) has been made the data which is so loaded into the cache is not available for access until a suitable time has passed for such operation to be fully completed. In order to prevent the transfer of such cache data onto the memory data bus until such time, such data is not made available until a (LOAD CACHE SV) signal is provided by register 48 which signal is present at a suitably delayed time after loading of the cache has commenced.

The register 49 shown in FIG. 9 provides a (REMOVE SV) signal, a (BUSY SV) signal, a (MEM-SELECT SV) signal and a (MATCH SV) signal as shown. In a manner similar to that discussed above with reference to the (LOAD CACHE SV) signal, such signals are delayed by preselected time periods following initiation of the operations specified so that such operations can be fully completed before a subsequent operation in connection therewith can commence.

Figure 11:
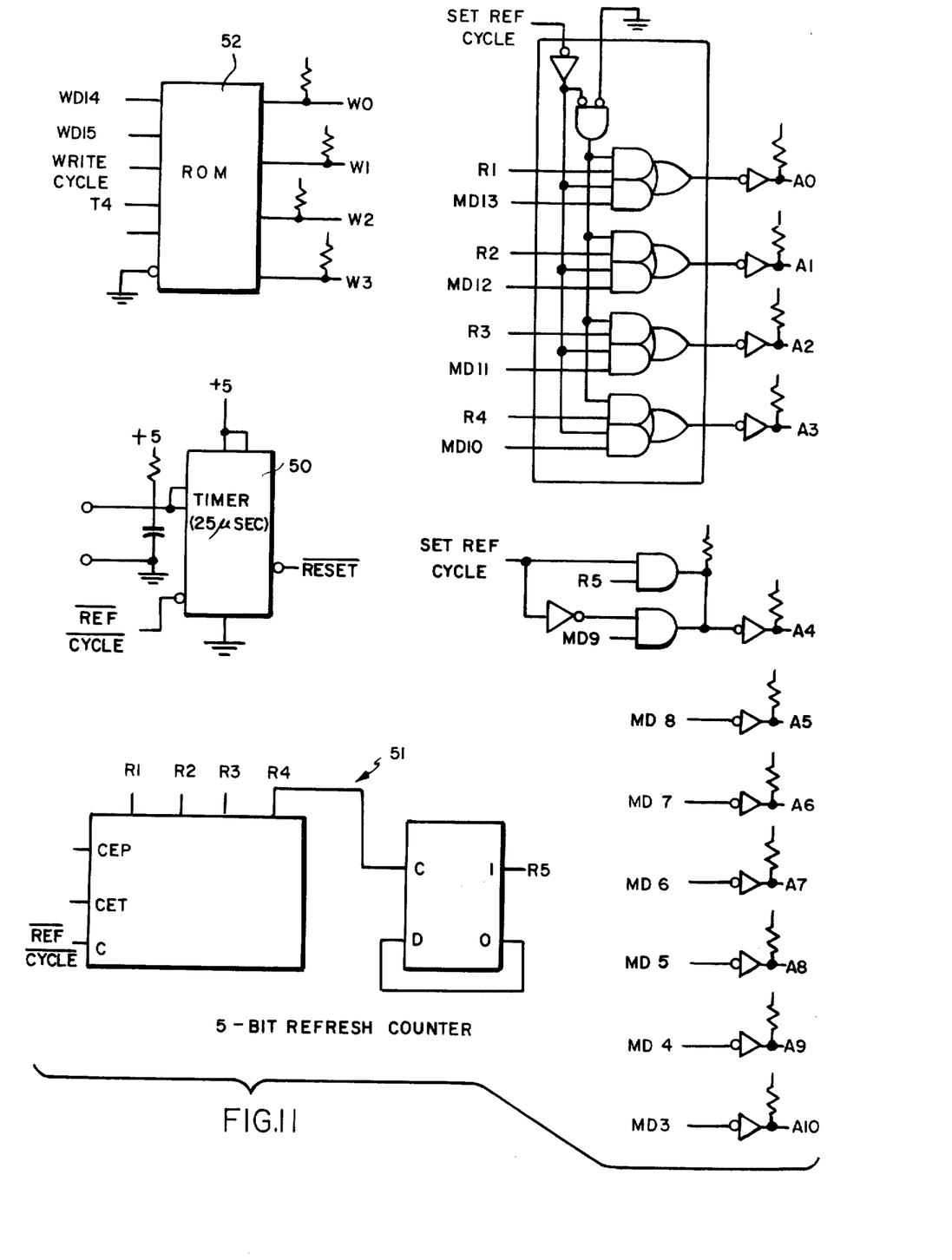
FIG. 11 shows more detailed diagrams of the refresh logic of FIG. 1.

The refresh logic is shown in FIG. 11. As is known, MOS memories require that the data stored therein be periodically refreshed. In accordance with the system shown, the (2K × 1) memory chips have memory cells arranged in a 32 × 64 matrix, the 64 bits of a particular one of the 32 rows being refreshed simultaneously (within less than 2 millisec.), and a particular row being refreshed every 25 microsec. so that the overall memory matrix of each (2K × 1) chip is refreshed every 800 microsec., which is adequate for periodically refreshing presently available MOS memories, for example.

As seen in FIG. 11, a 25 microsec. timer 50 is used together with a 5-bit refresh counter 51 for providing the counter signals to permit refreshing of all 32 rows. A read-only memory 52 (ROM) provides the write signals Wφ-W3 for each of the four rows of (2K × 1) memory chips of the main memory in accordance with the WRITE CYCLE signal from the memory control registers of FIG. 8 and the WD14 and WD15 signals from the address save logic of FIG. 4. The address driver signals Aφ-A4 are derived during the refresh cycle from the R1-R5 signals from the counter 51 in accordance with the SET REF CYCLE signal from FIG. 8.

Figure 12:
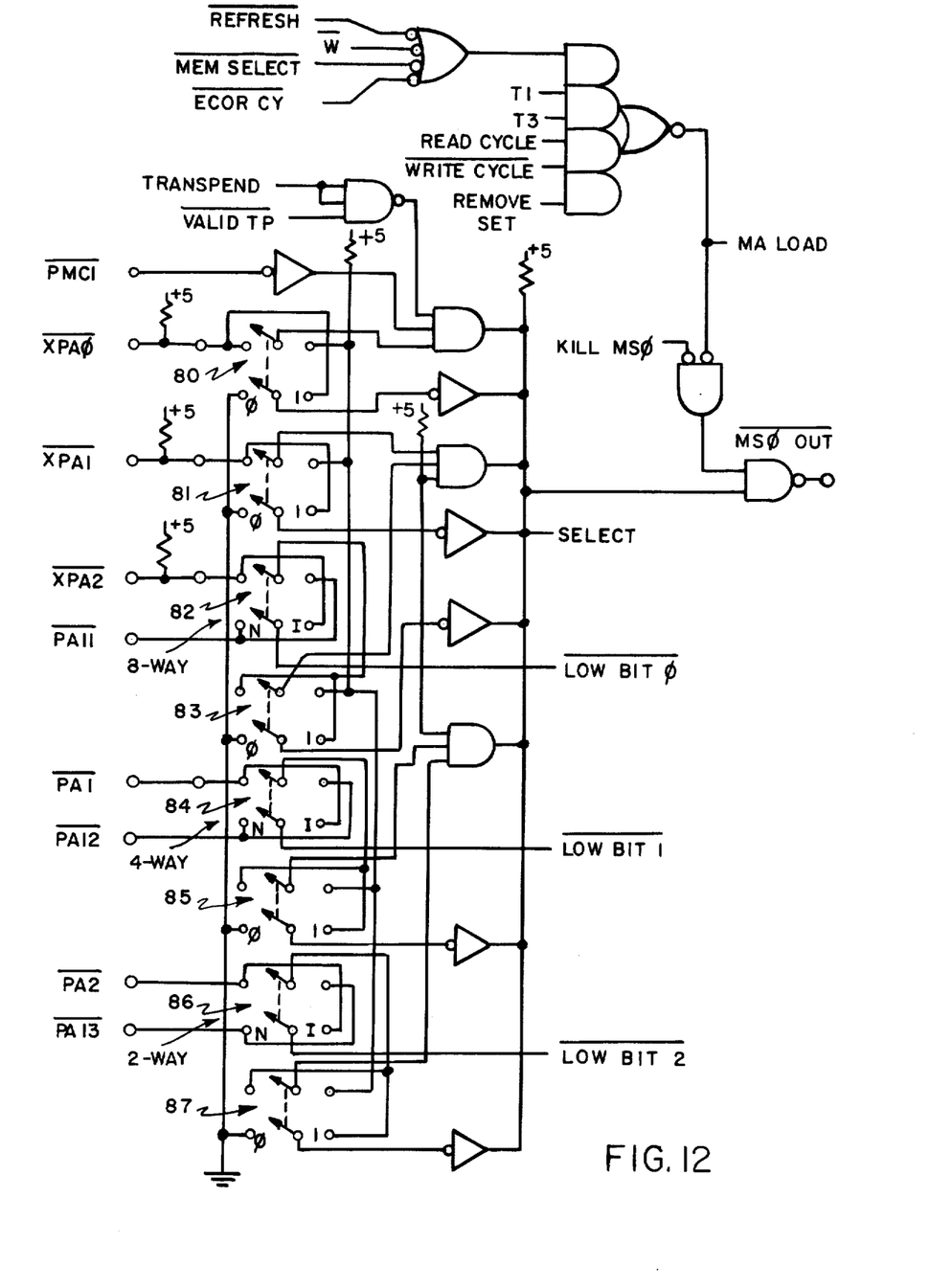
FIG. 12 shows a more detailed drawing of the logic for providing operation in an interleaved or non-interleaved manner of the cache memory of the memory module of FIG. 1.

FIG. 12 depicts the connections required at the memory module for providing interleaved or non-interleaved operations of the cache memory. The operation thereof for each type of interleaved process uses the 18 bit address of the system. Of the 18 bits available in an address, the main memory address information, as mentioned above, requires 11 bits, identification of the memory module selected requires 5 bits (for a system using 32 memory modules), and identification of the particular word in the cache memory of the selected module requires 2 bits.

For a non-interleaved system the address bits are arranged as follows from the most significant bit (MSB) to the least significant bit (LSB):

| MSB | | LSB |
|---|---|---|
| MODULE SELECT (5 Bits) | MAIN MEMORY ADDRESS (11 Bits) | CACHE WORD (2 Bits) |

18 Bits

For interleaved systems using 2-way, 4-way and 8-way interleaving the address bits are arranged as follows:

Thus, for a 2-way interleaving process, a 16K memory system uses two 8-K memory modules (designated as modules 1 and 2), each having a cache memory capable of storing four blocks of words (designated as blocks A, B, C and D). In accordance therewith, a sequence of 32 word blocks φ-31 can be stored in the word blocks of the cache memories of the modules in the following manner:

WORD BLOCKS φ-31 - CACHE MEMORY
BLOCKS 1A-1D and 2A-2D

| 0  | 1  | 2  | 3  | 4  | 5  | 6  | 7  |
|----|----|----|----|----|----|----|----|
| 1A | 2A | 1B | 2B | 1C | 2C | 1D | 2D |
| 8  | 9  | 10 | 11 | 12 | 13 | 14 | 15 |
| 1A | 2A | 1B | 2B | 1C | 2C | 1D | 2D |
| 16 | 17 | 18 | 19 | 20 | 21 | 22 | 23 |
| 1A | 2A | 1B | 2B | 1C | 2C | 1D | 2D |
| 24 | 25 | 26 | 27 | 28 | 29 | 30 | 31 |
| 1A | 2A | 1B | 2B | 1C | 2C | 1D | 2D |

For a 4-way interleaving process in a 32K memory system using four 8K memory modules a sequence of 32 word blocks can be stored in the cache memories as follows:

WORD BLOCKS φ-31 - CACHE MEMORY
BLOCKS 1A-1D, 2A-2D, 3A-3D and 4A-4D

| 0  | 1  | 2  | 3  | 4  | 5  | 6  | 7  |
|----|----|----|----|----|----|----|----|
| 1A | 2A | 3A | 4A | 1B | 2B | 3B | 4B |
| 8  | 9  | 10 | 11 | 12 | 13 | 14 | 15 |
| 1C | 2C | 3C | 4C | 1D | 2D | 3D | 4D |
| 16 | 17 | 18 | 19 | 20 | 21 | 22 | 23 |
| 1A | 2A | 3A | 4A | 1B | 2B | 3B | 4B |
| 24 | 25 | 26 | 27 | 28 | 29 | 30 | 31 |
| 1C | 2C | 3C | 4C | 1D | 2D | 3D | 4D |

For an 8-way interleaving process in a 64K memory system using eight 8K memory modules a sequence of 32 word blocks can be stored in the cache memories as follows:

WORD BLOCKS φ-31
CACHE MEMORY BLOCKS 1A-1D, 2A-2D,
3A-3D, 4A-4D 5A-5D, 6A-6D, 7A-7D, 8A-8D

| 0  | 1  | 2  | 3  | 4  | 5  | 6  | 7  |
|----|----|----|----|----|----|----|----|
| 1A | 2A | 3A | 4A | 5A | 6A | 7A | 8A |
| 8  | 9  | 10 | 11 | 12 | 13 | 14 | 15 |
| 1B | 2B | 3B | 4B | 5B | 6B | 7B | 8B |
| 16 | 17 | 18 | 19 | 20 | 21 | 22 | 23 |
| 1C | 2C | 3C | 4C | 5C | 6C | 7C | 8C |
| 24 | 25 | 26 | 27 | 28 | 29 | 30 | 31 |
| 1D | 2D | 3D | 4D | 5D | 6D | 7D | 8D |

In setting up each memory module for use in a non-interleaving or an interleaved operation the bits of the 18-bit address are identified in the particular system being described as comprising 15 address bits, PAφ through PA15, and 3 extra address bits, XPAφ through XPA2, which bits can be allotted as follows for each type of operation.

Operation | Address

Non-Interleaved

| MODULE SELECT (5 Bits) | MEM ADDRESS (11 Bits) | CACHE WORD (2 Bits) |
|---|---|---|
| XPA0-XPA2 PA1, PA2 | PA3 - PA13 | PA14 PA15 |

2-Way Interleaved

| MODULE SELECT (4 Bits) | MEM ADDRESS (11 Bits) | MODULE SELECT (1 Bit) | CACHE WORD (2 Bits) |
|---|---|---|---|
| XPA0-XPA2 PA1 | PA2 - PA12 | PA13 | PA14 PA15 |

4-Way Interleaved

| MODULE SELECT (3 Bits) | MEM ADDRESS (11 Bits) | MODULE SELECT (2 Bits) | CACHE WORD (2 Bits) |
|---|---|---|---|
| XPA0-XPA2 | PA1 - PA11 | PA12 PA13 | PA14 PA15 |

8-Way Interleaved

| MODULE SELECT (2 Bits) | MEM ADDRESS (11 Bits) | MODULE SELECT (3 Bits) | CACHE WORD (2 Bits) |
|---|---|---|---|
| XPA0 XPA1 | XPA2 PA1-PA10 | PA11 PA13 | PA14 PA15 |

For example, in the non-interleaved case the first five most significant bits are available to identify the memory module which is selected. In an 8-way interleaved system, the modules are identified by the first two most significant bits together with the third, fourth and fifth least significant bits. The memory address comprises 11 bits which identify the cache block of the cache memory in the selected module and two bits are required for identification of the cache word within the identified cache block.

Implementation of the schemes discussed above in each memory module is shown in FIG. 12 wherein the logic accepts address information with reference to bits XPAφ-XPA2, PA1, PA2, and PA11-PA13, which bits, as seen above, are the only bits which are involved for identifying the module and cache selections in each of the non-interleaved and interleaved situations.

LOW BIT φ, LOW BIT 1 and LOW BIT 2 represent the fifth, fourth and third least significant bits, respectively, of the 18-bit address. The main memory address utilizes all three low bits as PA11, PA12 and PA13 for a non-interleaved scheme, utilizes only LOW BIT 1 and LOW BIT 2 as PA11 and PA12 for a 2-way interleaving, utilizes only LOW BIT 2 as PA11 for 4-way interleaving and utilizes none of the three low bits for 8-way interleaving. In each case where PA11, PA12 and PA13 are not used in the main memory address they are used to identify the correct module to be selected, as discussed above.

A plurality of switches 80–87 are utilized to provide the appropriate interconnections for selecting the desired memory module for both non-interleaved and interleaved situations. For a system utilizing 32 8K memory modules, selection thereof is identified by the appropriate use of switches 80, 81, 83, 85 and 87 which, in any particular situation, accordingly, can be considered for convenience as representing a 5-bit code to signify a selected one of 32 modules. The placement of such switches to the left as shown in the drawing can be said to represent a "0" and placement to the right a "1", as depicted in FIG. 12. As an example, if selection of the next to the lowest memory module is to be made and such module corresponds to the five-bit code 00001, switches 80, 81, 83 and 85 are in their left (or "0") position while switch 87 is in its right (or "1") position.

Further, the selection of positions for switches 82, 84 and 86 provides an appropriate means for selecting a suitable interleaved or non-interleaved situation. For a non-interleaved position all of such latter switches are placed in their left (or "N") positions, while for two-way interleaving only switch 86 is placed in its right (or "I") position, for four-way interleaving both switches 84 and 86 are placed in their right positions, and for eight-way interleaving all three switches 82, 84 and 86 are placed in their right positions.

As a further example, if a module represented by the five-bit module selection code 00010 is to be selected in a two-way interleaved situation, switches 80, 81, 83 and 87, as well as switches 82 and 84, are in their left positions while switches 85 and 86 are in their right positions.

As a further example, if the highest address block of the 32 memory modules (represented by 11111) is selected in an eight-way interleaving situation, all of the switches 80–87 are placed in their right positions.

Figure 13:
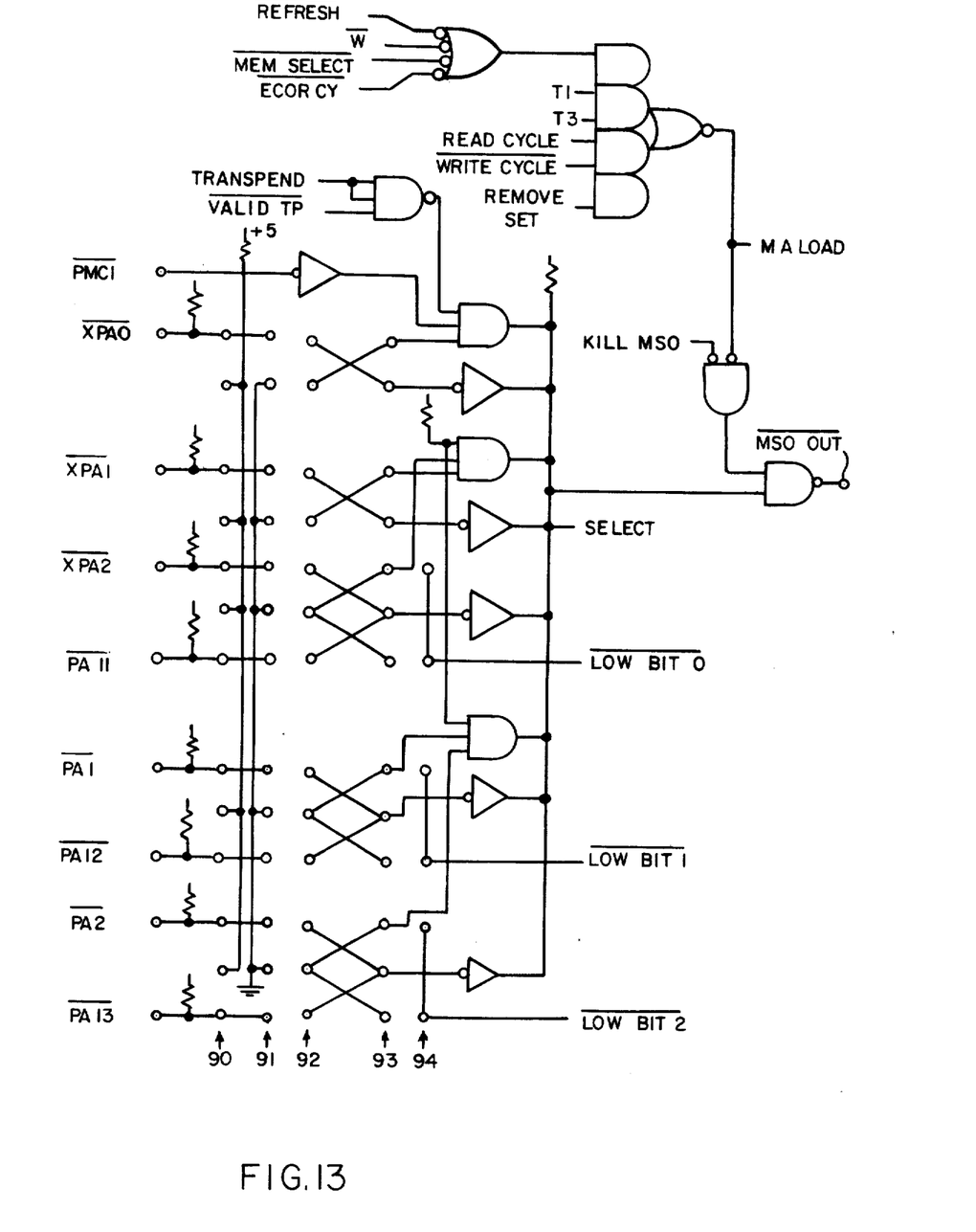
FIG. 13 shows an alternative embodiment of the logic shown in FIG. 12.

Alternatively, the switches can be replaced by terminals which can be appropriately interconnected by suitable jumper connections, as shown in FIG. 13. In order to illustrate how such jumper connections are arranged for particular exemplary module selections and the particular exemplary selections of an interleaved or non-interleaved situation, all of the terminals of FIG. 13 (i.e., corresponding to the terminals in the columns designated 90–94) are set forth diagrammatically in FIGS. 14, 15 and 16 and the jumper connections corresponding to the switch connections for the three examples discussed above with reference to FIG. 12 are shown therein.

Figure 14:
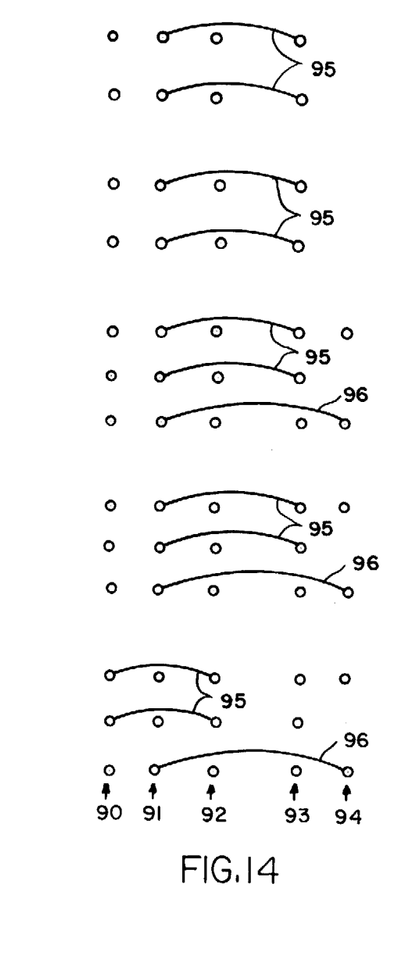
FIGS. 14-16 are diagrammatic illustrations used to explain the operation of the logic of FIG. 13.

Thus, in FIG. 14, module selection jumpers 95 are connected as shown to provide a module selection corresponding to module select code 00001, while jumpers 96 are connected as shown to provide a non-interleaved situation.

Figure 15:
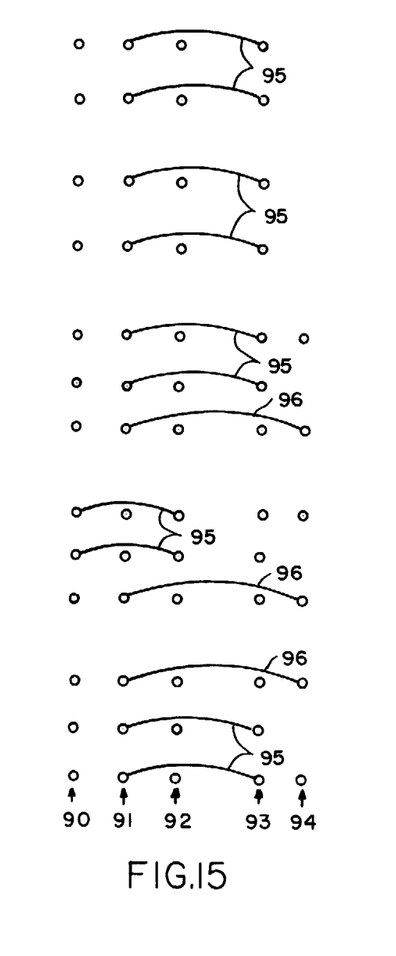

In FIG. 15, module selection jumpers 95 provide for selection of a module in accordance with module select code 00010, while jumpers 96 provide for two-way interleaving.

Figure 16:
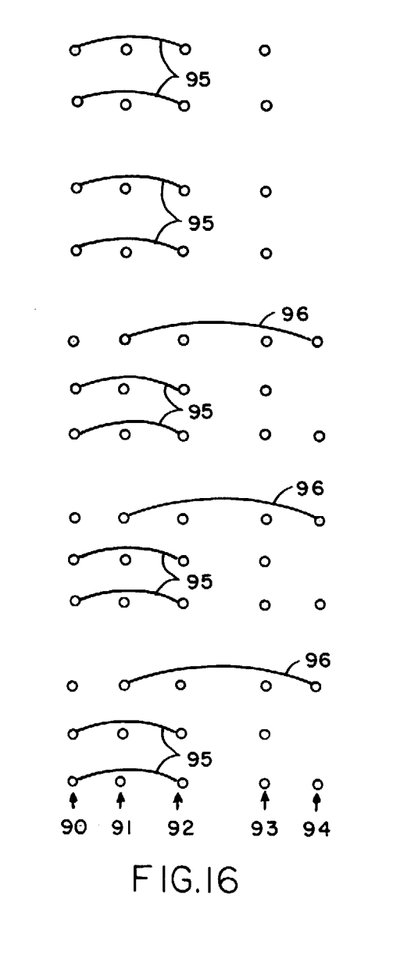

In FIG. 16, module selection jumpers 95 provide for selection of a module in accordance with module select code 11111, while jumpers 96 provide for eight-way interleaving.

In each case the pattern of jumper connections in FIG. 13 and the pattern of switch connections in FIG. 12 which are required for different situations are apparent from the examples discussed above.

What is claimed is:

1. A memory module for use in a data processing system having a plurality of memory modules and a memory address bus for transferring addresses in said system, each said memory module comprising
   a main memory means operable at a first speed;
   an auxiliary memory means operable at a second speed higher than said first speed for temporarily storing selected portions of the data stored in said main memory means;
   associative memory means for temporarily storing selected main memory addresses and comparing the stored addresses with an address supplied from said memory address bus to said associative memory means during a read or write operation to generate comparison data for indicating whether data requested by said supplied address is stored in said auxiliary memory means; and
   means for storing said selected data portions in said auxiliary memory means so that the data stored in the auxiliary memory means of all of said plurality of memory modules are arranged in an interleaved manner such that data which are expected to be referenced sequentially during the operation of said data processing system are sequentially stored in the auxiliary memory means of different ones of said memory modules.

2. A memory module for use in a data processing system in accordance with claim 1 wherein said system comprises N memory modules, where N is an even integer, said selected data portions being stored in an N-way interleaving manner such that each sequential group of N sequential words is stored sequentially in the auxiliary memory means of said N memory modules.

3. A memory module for use in a data processing system in accordance with claim 2 where N is 8.

4. A memory module for use in a data processing system in accordance with claim 2 wherein N is 4.

5. A memory module for use in a data processing system in accordance with claim 2 wherein N is 2.

6. A memory module for use in a data processing system in accordance with claim 1 wherein
   the addresses used in said system are arranged to include a first plurality of bits for identifying a selected memory module, a second plurality of bits for identifying an address in the main memory means of said selected memory module, and a third plurality of bits for identifying a selected word in the auxiliary memory means of said selected module.

7. A memory module for use in a data processing system in accordance with claim 6 wherein each said memory module includes logic means responsive to said first plurality of bits of said address for determining said selected memory module.

8. A memory module for use in a data processing system in accordance with claim 7 wherein said logic means includes modifiable interconnections which are selectively arranged so that the positions of said first plurality of bits in said word addresses are allotted in accordance with the manner in which data in said auxiliary memory means are interleaved.

9. A memory module for use in a data processing system in accordance with claim 8 wherein said modifiable interconnections comprise a plurality of switch means, selected ones of said switch means being actuated so as to allot the positions of said first plurality of bits in accordance with the manner in which said data are interleaved.

10. A memory module for use in a data processing system in accordance with claim 8 wherein said modifiable interconnections comprise a plurality of movable jumper connections, the arrangement of said jumper connections being selected so as to allot the positions of said first plurality of bits in accordance with the manner in which said data are interleaved.

* * * * *